United States Patent [19]
Saito

[11] Patent Number: 5,884,919
[45] Date of Patent: *Mar. 23, 1999

[54] SEALING DEVICE AND SEALING DEVICE MANUFACTURING METHOD

[75] Inventor: Takayuki Saito, Fukushima, Japan

[73] Assignee: Nok Corporation, Tokyo, Japan

[21] Appl. No.: 672,471

[22] Filed: Jun. 28, 1996

Related U.S. Application Data

[63] Continuation of Ser. No. 75,487, filed as PCT/JP92/01353, Oct. 16, 1992, abandoned.

[30]  Foreign Application Priority Data

Oct. 18, 1991 [JP] Japan ................................... 3-298032

[51] Int. Cl.$^6$ ........................................................ F16J 9/06
[52] U.S. Cl. ......................... 277/562; 277/549; 277/572; 277/575; 264/138; 264/268
[58] Field of Search ..................... 277/152, 549, 277/560, 562, 572, 575; 264/138, 159, 266, 268

[56]       References Cited

U.S. PATENT DOCUMENTS

| 4,497,496 | 2/1985 | Repella ................................ 277/152 |
| 4,501,431 | 2/1985 | Peisker et al. ......................... 277/152 |
| 4,867,926 | 9/1989 | Matsushima ........................... 264/268 |
| 5,104,603 | 4/1992 | Saitoh ..................................... 264/268 |
| 5,106,565 | 4/1992 | Saito ...................................... 264/263 |
| 5,183,271 | 2/1993 | Wada et al. ............................ 277/152 |
| 5,183,617 | 2/1993 | Saitoh .................................... 264/266 |
| 5,213,343 | 5/1993 | White, Jr. .............................. 277/152 |

FOREIGN PATENT DOCUMENTS

| 53-56456 | 5/1978 | Japan . |
| 61-92795 | 6/1986 | Japan . |
| 61-170769 | 10/1986 | Japan . |
| 1188768 | 7/1989 | Japan . |

*Primary Examiner*—Daniel G. DePumpo
*Attorney, Agent, or Firm*—Armstrong, Westerman, Hattori, McLeland & Naughton

[57]       ABSTRACT

Handling ability can be improved and operational defect at a time of integral formation with a rubber like elastic seal lip can be prevented by effecting a chamfering working to an edge portion of a conical washer like resin ring. In a method in which a conical washer like resin ring 40 is formed by conically cutting away an end surface 51 of a cylindrically formed resin material 50 with a predetermined thickness and the resin ring is utilized as a seal lip 3 by assembling the inner diameter end portion or outer diameter end portion with a device body, it is characterized in that a sharply projecting edge portion 47 on the side utilizing as the seal lip of the conical washer like resin ring 40 is subjected to chamfering working 45, 46. It is characterized in that the resin ring 40 is assembled with the device body having a rubber like elastic seal lip 2.

12 Claims, 9 Drawing Sheets

SEALING DEVICE AND SEALING DEVICE MANUFACTURING METHOD

This application is a continuation of application Ser. No. 08/075,487 filed Nov. 22, 1993, now abandoned.

TECHNICAL FIELD

The present invention relates to a method of manufacturing a sealing device provided with, for example, a resin seal lip, and more particularly, to a sealing device having a resin seal lip formed with a conical washer-shaped resin ring and a method of manufacturing the same.

BACKGROUND ART

Figure 9A:
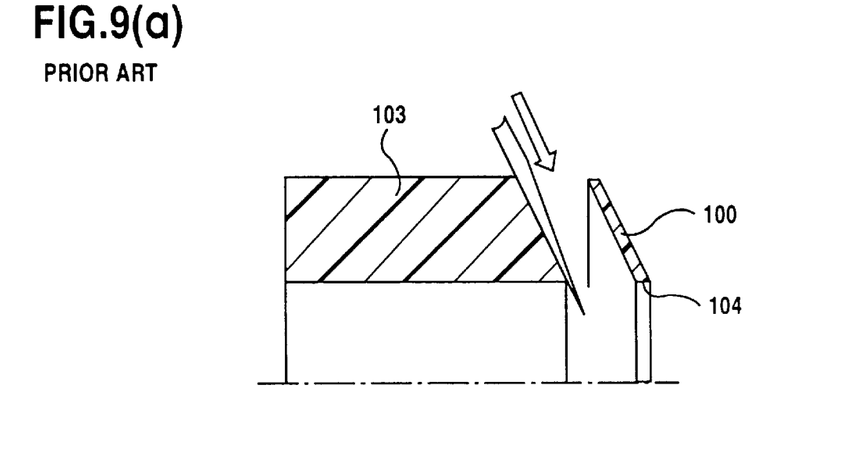
Figure 9B:
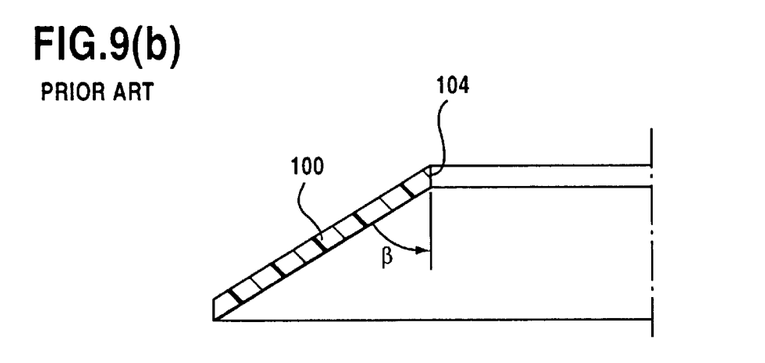
Figure 9C:
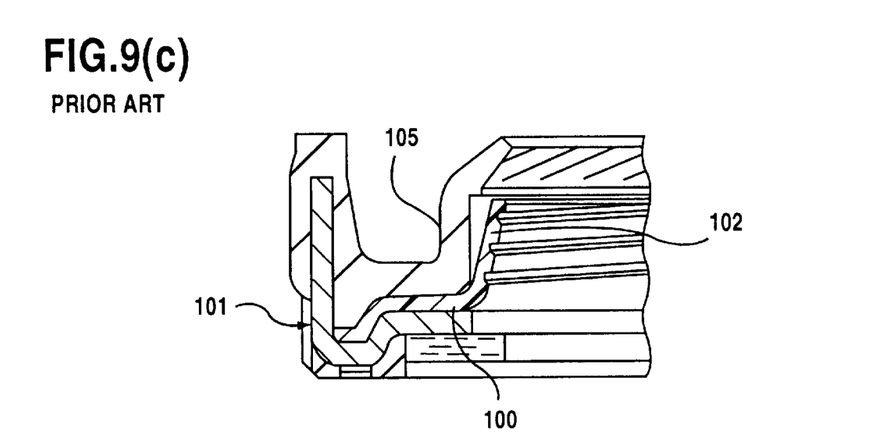

In a conventional sealing device with a resin seal lip (such as shown in FIG. 9), a washer-shaped resin ring 100 is formed, the outer diameter side of the resin ring 100 is assembled with a device body 101, and the inner end of the resin ring 100 is contacted in a sealing manner to an objective member, thus forming a resin seal lip 102.

The resin ring 100 is formed by cutting a cylindrical resin material 103 so as to have a conical washer-like shape so that the resin seal lip 102 is preliminarily provided with an inclination so as to facilitate formation thereof.

However, in the described prior art, when the a cylindrical resin material 103 is cut away in a conical shape, a thin edge portion 104 having a sharp angle β smaller than 90° is formed at an end portion of the resin ring 100. Since this thin edge portion 104 is easily deformable, it is difficult to handle the same.

Figure 10A:
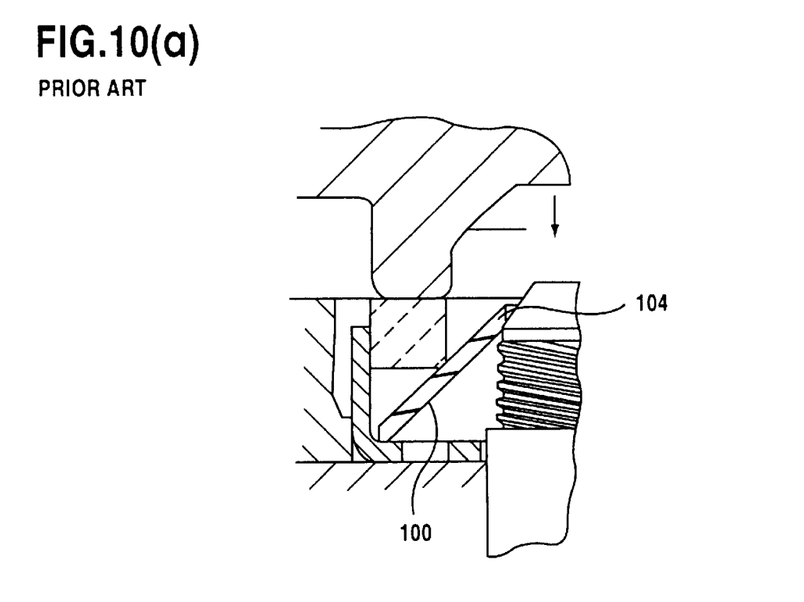

In the case of a compound type sealing device, as shown in FIG. 9(c), having a seal lip 105 formed of a rubber like elastic material and a resin seal lip 102, when the rubber like elastic seal lip 105 is molded, the resin ring 100 is inserted and the assembling of the resin ring 100 and the molding thereof are carried out at the same time as shown in FIG. 10(a). At the completion of the molding and the opening of the mold, the resin ring 100 separates from the rubber like elastic seal lip 105 due to its elastic restoring force and falls down to an inner diameter side so as to have an interference.

Figure 10B:
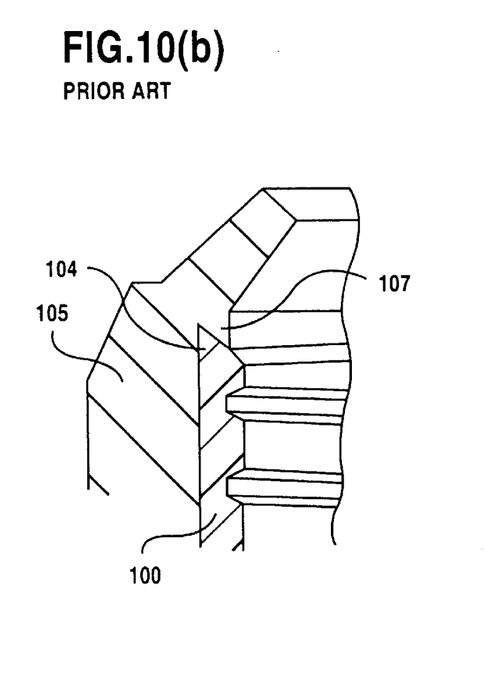

However, the rubber base material 106 fluidized at the molding formation time extends around so as to bite the edge portion 104, so that, when the edge portion 104 has a sharp end, a go-round portion 107 engages the edge portion 104 of the resin ring 100 and the resin seal lip 105 sharply turns to the inner diameter side (see FIG. 10(b)).

Figure 10C:
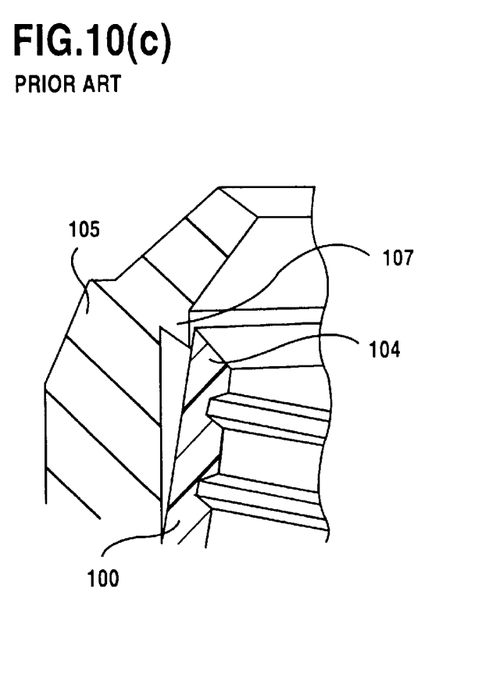

Further, in a case where the resin seal lip 105 returns, when a shaft is inserted, the front end of the resin seal lip 102 is interferred with by the rubber like elastic seal lip 105. The rubber like elastic seal lip 105 widens and acts in a direction reducing the interference, so that the reliance of the rubber like elastic seal lip 105 is lowered (see FIG. 10(c)).

The present invention was conceived to solve the above problems of the prior art and aims to provide a sealing device and a method of munufacturing the same capable of improving a handling ability thereof and preventing an operational defect at a time of the integral molding with the rubber like elastic seal lip by effecting a chamfering working to the edge portion of a resin ring so as to provide a conical washer shape.

DISCLOSURE OF THE INVENTION

In order to achieve the above object, the method of manufacturing a sealing device of the present invention, in which resin ring is formed in conical washer shape by cutting away an end portion of a cylindrical resin material with a predetermined thickness and a body of a device is assembled with an inner diameter side end or outer diameter side end of the resin ring to thereby form a seal lip, is characterized in that a sharply projecting edge portion of the conical washer like resin ring on the side used as a seal ring is chamfered.

It is preferred that a shape of the chamfered portion is composed of a first chamfered portion substantially perpendicular to a central axis of the resin ring and a second chamfered portion substantially perpendicular to the conical surface.

Further, it is effective that the conical washer like resin ring is cut away from the end portion of the cylindrical resin material so that an inner diameter end side conically projects and the sharp edge portion of the inner diameter end side of the resin ring is subjected to a chamfering working before the cutting-away of the resin ring and the resin ring is thereafter cut away.

It is preferred that the first and second portions to be chamfered are chamfered by a bite having first and second blade portions respectively corresponding to the first and second chamfered portions.

The resin ring may be assembled with a device body having the rubber like elastic seal lip.

It is further effective that the resin ring is inserted into the mold assembly at the time of molding of the rubber like elastic seal lip of the device body to thereby integrally form with the device body.

According to the manufacturing method of the sealing device of the present invention, by effecting the chamfering working to the sharply projecting edge portion of the end portion of the resin ring, the thin edge of the end portion of the resin ring is eliminated and hardly deformed, thus improving the handling ability.

Furthermore, a method of manufacturing a sealing device by utilizing a mold assembly including an inner cavity is characterised by the steps of:

arranging a reinforcing ring in the cavity of the mold assembly;

forming a resin ring in conical washer shape by conically cutting away an end surface of a cylindrical resin material with a predetermined thickness and effecting a chamfering working to a sharply projecting edge portion of an inner diameter side end portion which is to be used as a seal lip of the resin ring;

disposing the chamfered resin ring on the reinforcing ring in the mold cavity;

disposing a rubber like elastic material on the resin ring;

molding the rubber like elastic material in a predetermined shape by heating under pressure the reinforcing ring, the resin ring and the rubber like elastic material so as to fluidize the rubber like elastic material to fill in the mold cavity; and bending the resin ring so as to provide an L-shaped section by utilizing a pressure of the rubber like elastic material fluidized in the mold cavity.

In such a case as that in which the resin ring is integrally molded with the rubber like elastic seal lip, there is no sharp edge portion, so that the resin ring is not engaged with it even if the fluidized rubber like elastic material is moved round the end portion of the resin ring, and accordingly, the resin seal lip can operates smoothly without interferring with the rubber like elastic seal lip.

In this case, it is preferred that the chamfered portion is composed of a first chamfered portion substantially perpendicular to a central axis of the resin ring and a second chamfered portion substantially perpendicular to the conical surface.

Further, it is preferred that the conical washer like resin ring is cut away from the end portion of the cylindrical resin material so that an inner diameter end side conically project, the sharp edge portion of the inner diameter end side of the resin ring is subjected to a chamfering working before the cutting-away of the resin ring and the resin ring is thereafter cut away.

Further, it is preferred that the first and second portions to be chamfered are chamfered by a bite having first and second blade portions respectively corresponding to the first and second chamfered portions.

It is also characterized that a resin seal lip portion which is a portion before the chamfered resin ring has been disposed in the mold cavity and which corresponds to a portion to be bonded to the rubber like elastic material is subjected to a surface treatment such as sodium treatment.

The resin ring is forced against the reinforcing ring by utilizing a pressure of the fluidized rubber material and the resin ring is fixed to the reinforcing ring by biting the same.

On the other hand, the sealing device of the present invention is mounted between a housing and a rotation shaft relatively rotatable with respect to the housing and characterized by comprising:

a first seal ring having an annular flange portion disposed so as to surround the rotation shaft and extend in a radial direction thereof and a resin seal lip disposed so as to surround the rotation shaft from an inner diameter end portion of the resin flange portion and extend in and along the axial direction of the rotation shaft towards a fluid side to be sealed, the resin seal lip having a seal surface slidably contacting the rotation shaft in a sealed manner; and a second seal ring having a rubber like elastic flange portion disposed so as to surround the rotation shaft and extend in the radial direction thereof and a rubber like elastic seal lip disposed so as to surround the resin seal lip and extend in and along the axial direction of the rotation shaft beyond the resin seal lip towards the fluid to be sealed, the rubber like elastic seal lip having a lip front end provided with a seal surface slidably contacting the rotation shaft in a sealed manner.

The first seal ring being formed by bending a conical washer like resin ring 60 as to provide an L-shaped section and the resin seal lip having a front end edge portion which is subjected to a chamfering working.

It is characterized that the chamfered surface is composed of a first chamfered portion substantially perpendicular to a central axis of the resin ring and a second chamfered portion substantially perpendicular to the conical surface.

Further, the resin flange portion and the rubber like elastic flange portion are bonded through at least one continuous bonded portion so as to continuously surround at least the rotation shaft to thereby seal the bonded portion between the resin flange portion and the rubber like elastic flange portion.

Further, it may be possible that the continuous bonded portion is a portion formed on an outer diameter side end surface of the resin flange portion or on a side surface thereof on the sealed fluid side, and the continuous bonded portion is not limited to one portion and may be formed to a plurality of portions.

It is preferred that the outer diameter side end surface of the resin flange portion is formed of a resin ring cut away in conical washer shape having a taper surface.

BRIEF DESCRIPTION OF THE DRAWINGS

FIGS. 1(*a*) to (*d*) are sectional views of a main portion of a cylindrical material for the explanatory of molding processes in a manufacturing method of a sealing device of the present invention.

FIG. 2(*a*) is a sectional view of half of-a resin ring and FIG. 2(*b*) is an enlarged sectional view of an end portion of the resin ring of FIG. 2(*a*).

FIGS. 3(*a*) to (*c*) are views for the explanatory of a vulcanization molding processes of the sealing device, in which FIG. 3(*a*) is a sectional view of a main portion in a mold opened state, and FIGS. 3(*b*) and (*c*) are sectional views of the main portion in a mold closed state.

FIGS. 4(*a*) and (*b*) Are sectional views of the main portion showing a condition of a resin seal lip and a rubber like elastic seal lip after the molding process.

FIG. 9(*a*) is a sectional view of the main portion in a condition of cutting away a conventional resin ring, FIG. 9(*b*) is a sectional view of half of the cut-away resin ring, and FIG. 9(*c*) is a sectional view of the main portion showing one example of the sealing device to which a conventional resin ring is used.

FIG. 10(*a*) is a sectional view of the main portion showing a mold forming state of the conventional sealing device and FIGS. 10(*b*) and (*c*) are views showing relationship between a resin seal lip and a rubber like elastic seal lip of the sealing device molded by the mold assembly of FIG. 10(*a*).

BEST MODE FOR EMBODYING THE INVENTION

Hereinbelow, the present invention is explained with reference to an embodiment illustrated.

Figure 5:
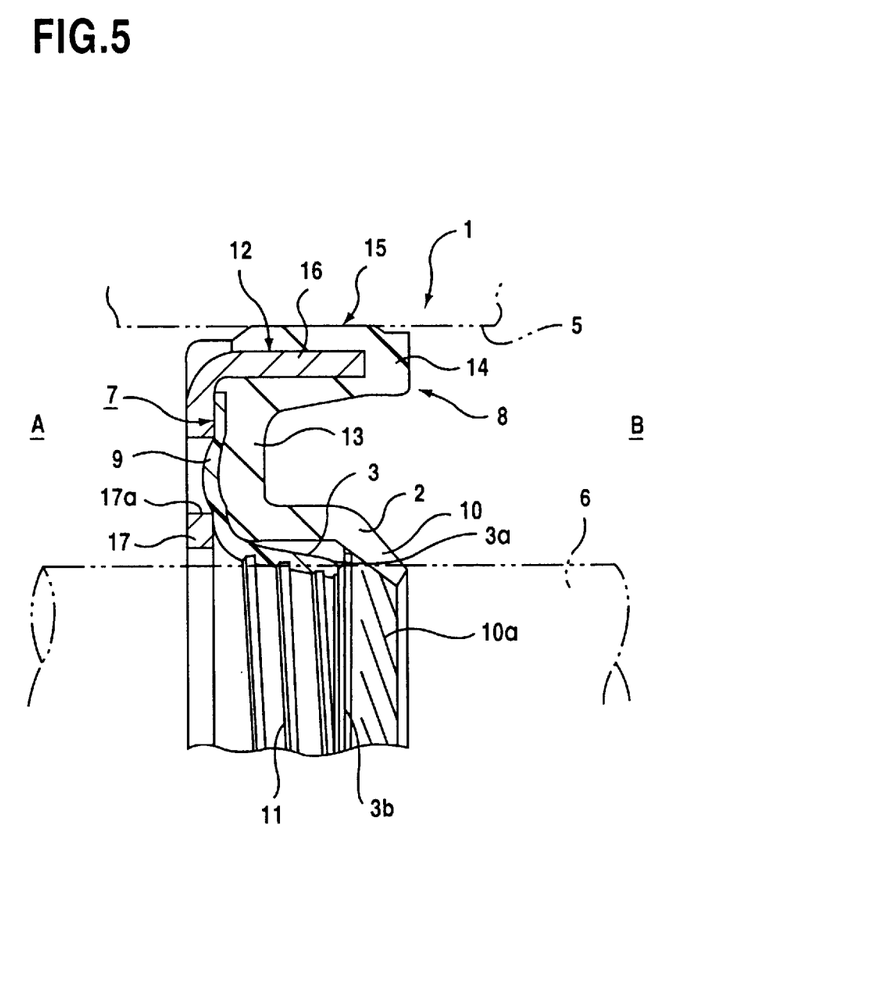
FIG. 5 is a sectional view of the main portion showing one example of the sealing device of the present invention.

FIG. 5 shows one example of a sealing device manufactured by a sealing device manufacturing method according to the present invention.

Namely, this sealing device 1 is provided with a rubber like elastic seal lip 2 and a resin seal lip 3 formed of PTFE or the like, and the rubber like elastic seal lip 3 is integrally baked with a metallic reinforcing ring 4.

This sealing device 1 is an annular member mounted in a gap formed between the inner periphery of a housing 5 and the outer periphery of a rotation shaft 6 assembled coaxially and relatively rotatably and is provided with a first seal ring 7 made of a resin and a second seal ling 8 formed of a rubber like elastic material.

The first seal ring 7 is composed of a resin flange portion 9 extending radially and formed in form of a washer so as to surround the rotation shaft 6 and the resin seal lip 3 cylindrically extending along the axial direction from the inner diameter end side of the resin flange portion 9. The inner periphery of the resin seal lip 3 slidably contacts a circumferential surface of the rotation shaft 6 in a sealed manner. The sliding surface between the resin seal lip 3 and the rotation shaft 6 is formed with a screw groove 11 attaining a screw-pumping function for enhancing the sealing effect.

This first seal ring 7 is formed by bending, in an L-shape in section, a resin ring 40 in form of conical washer as shown in FIG. 1, and a chamfering working is effected to the front edge portion of the resin seal lip 3 to which a lip end 10 of the rubber like elastic seal lip 2 is applied. In this embodiment, first and second chamfered portions 3a and 3b are formed. Namely, the first chamfered portion 3a has a tapered surface having a diameter gradually reducing towards the sealed fluid side and the second chamfered portion 3b forms a surface substantially perpendicular to the rotation shaft 6.

Either only one of the first chamfered portion 3a or the second chamfered portion 3b may be selected.

On the other hand, the second seal ring 8 is formed of a rubber like elastic material which is reinforced by the reinforcing ring 4 and is provided with a rubber like elastic flange portion 13 in form of a washer extending radially and a rubber like elastic seal lip 2 extending axially from the inner diameter side end of the rubber like elastic flange portion 13. A cylindrical outer peripheral fitting portion 15 fitted in a sealed manner to the inner periphery of the housing 5 is integrally formed.

A reinforcing ring 12 is a metal annular member having an L-shape section and formed with an outer cylindrical portion 16 embedded integrally in the outer peripheral fitting portion 15 and a metal flange portion 17 extending radially inward from an atmosphere side end edge of the outer cylindrical portion 16. This metal flange, portion 17 supports, on an atmosphere side, the side surface of the resin flange portion 9 of the first seal ring 7. The metal flange portion 17 and the resin flange portion 9 are mutually overlapped. Accordingly, the rubber like elastic flange portion 13, the resin flange portion 9 and the. metallic flange portion 17 are arranged in the overlapped manner in this order from the objective fluid side B towards the atmosphere side A.

Furthermore, the rubber like elastic seal lip 2 is disposed along the outer periphery of the resin seal lip 3 so as to surround the resin seal lip 3, and the lip front end 10 extends towards the objective fluid side to be sealed beyond the front end of the resin seal lip 3 to slidably contact the outer periphery of the rotation shaft 6 in a sealing manner. A screw-groove 10a attaining a screw pumping function is also formed to the sliding surface of the lip front end 10.

The fluid to be sealed is double sealed by the rubber like elastic seal lip 2 and the resin seal lip 3.

Furthermore, the pressure of the sealed fluid acting on the rubber like elastic seal lip 2 is supported by the resin seal lip 3 to thereby prevent an increasing of an excessive sliding resistance of the lip front end 10 of the rubber like elastic seal lip 2 and a progressing of wear thereof under high pressure.

The rubber like elastic seal lip 2 extends along the back surface of the resin seal lip 2, but they are separated from each other and are mutually independently movable, and thus, the characteristics of the rubber like elastic seal lip 2 following to a fine irregular surface condition or vibration of the surface of the rotation shaft 6 are not damaged.

Contacting surfaces of the resin flange portion 9 of the first seal ring 7 and the rubber like elastic flange portion 13 of the second seal ring 8 may be fixedly bonded or not bonded.

Figure 6:
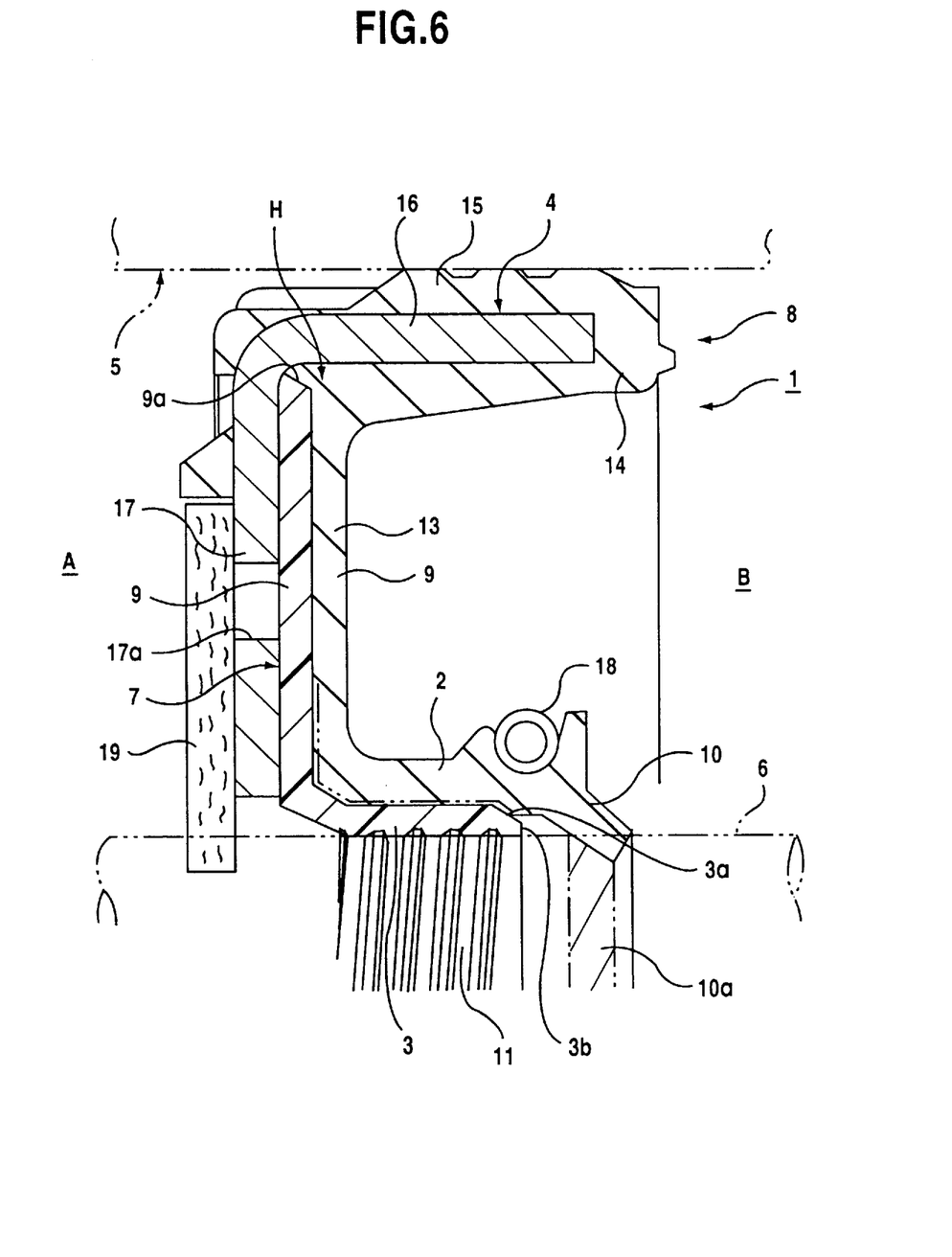
FIG. 6 is a sectional view of the main portion showing another example of the sealing device of the present invention.

FIG. 6 shows a sealing device according to another embodiment of the present invention. In this embodiment, like in the above first embodiment, the resin seal lip 3 is formed as shown in FIG. 1 by bending the conical washer-shaped resin ring 40 so as to provide an L-shaped cross section, and as described with respect to the first embodiment, the front end of the resin seal lip 3 is formed with chamfered portions 3a and 3b. Regarding the same constructional portions as those of the first embodiment, the same reference numerals are added and explanations thereof are omitted herein, and hence, with portions difference are only described hereunder.

In this embodiment, the resin flange portion 9 of the first seal ring 7 and the rubber like elastic flange portion 13 of the second seal ring 8 are fixedly bonded to prevent the sealed fluid from leaking along the bonded surfaces between the first seal ring 7 and the second seal ring 8.

An area bonded with the resin flange portion 9 and the rubber like elastic flange portion 13 has a continuous bonded portion H continuously surrounding at least the rotation shaft 6. The formation of the continuous bonded portion H can prevent the sealed fluid from leaking along the bonded surfaces between the resin seal lip 3 and the rubber like elastic seal lip 2.

In the illustrated embodiment, the continuous bonded portion H is formed to an end surface 9a on the outer diameter side of the resin flange portion 9. The end surface 9a has a tapered portion inclining towards the the side B of the fluid to be sealed so as to reduce the diameter thereof, thereby enlarging the bonded area between it and the rubber like elastic member 14 to ensure the bonding therebetween.

Figure 7:
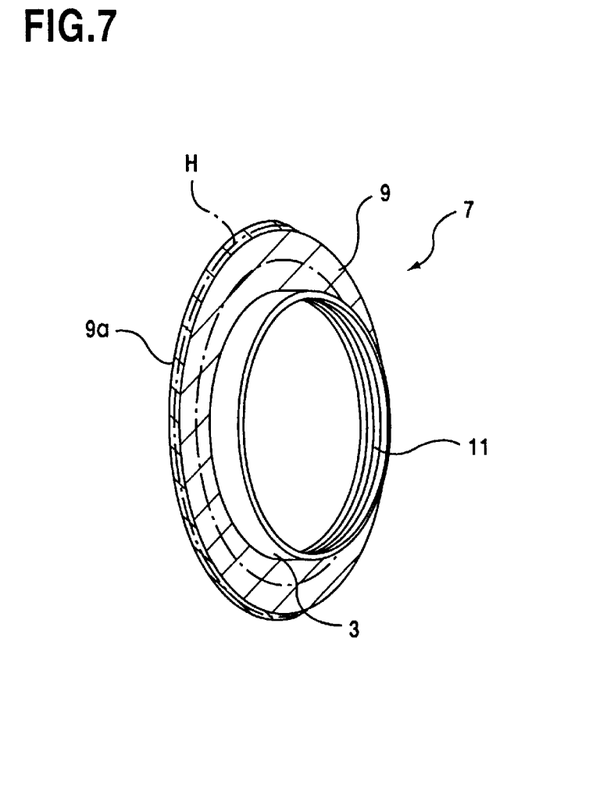
FIG. 7 is a schematic perspective view of a first seal ring of the sealing device of FIG. 6.

It is of course to be noted that the formation of the continuous bonded portion H is not limited to the end surface 9a of the resin flange portion 9 and its formation can be made to any optional portion within a region at which the resin flange portion 9 contacts the rubber like elastic flange portion 13 as shown in FIG. 7 with hattched lines. However, in consideration of the followability of the rubber like elastic seal lip 2, it is preferred that the continuous bonded portion H is formed a position in the vicinity of the end portion of the outer diameter side other than at the end portion of the inner diameter side.

Furthermore, it is to be noted that the continuous bonded portion H is not limited to the formation in one portion and may be formed to a plurality of portions so as to surround several times from the inner diameter end side near the resin seal lip 3 towards the outer diameter end side. According to such formation, even if leakage occurs at one continuous bonded portion H, the sealing effect can be achieved at other continuous bonded portion H, thus enhancing the sealing reliance.

The continuous bonded portion may be formed so as to entirely bond the contacting surface without forming partially.

Still furthermore, the contacting surfaces of the resin flange portion 9 and the metal frange portion 17 may be bonded or not bonded. The sealing performance can be further improved by forming a continuous bonded portion between the resin flange portion 9 and the metal flange portion 17 like as that between the resin flange portion 9 and the rubber like elastic material flange portion 13.

Further, in this embodiment, a spring 18 is mounted to the lip end portion 10 of the rubber like elastic seal lip 2, and a dust seal member 19 is fixedly bonded on the atmosphere side of the metal flange portion 17 to prevent intrusion of the dust. The dust seal member 19 is formed in shape of washer from a cloth such as non-woven fabric, and the inner diameter side end slidably contacts the rotation shaft 6.

Though not shown, the resin flange portion 9 bites the hole 17a formed to the metal flange portion 17, as described with respect to the embodiment of FIG. 5, to ensure the firm fixing.

A manufacturing method of the sealing device of the characters mentioned above will be described hereunder with reference to FIG. 3.

Namely, a rubber base substance 30 as a rubber like elastic material for forming the resin seal lip 3 and a ring 40 formed of resin such as PTFE for forming the resin seal lip 3 in the shape of conical washer are set so as to cover an opening of the cavity 4 before the location in the mold assembly 20. The rubber base substance 30 is on the resin ring 40 and the mold assembly is then clamped, and heated and pressed.

The lower mold half 22 of the mold assembly comprises a lower mold body 24, a core 26 fitted in a central hole of the lower mold body 24 and projecting upward, and an annular ring mold 27 disposed concentrically to the upper surface of the lower mold body 24 with a predetermined distance from the core 26 so that an annular recess 28 having a rectangular section is defined between the outer periphery of the core 26, the inner periphery of the ring mold 27 and the lower mold body 27 so as to be opened upward.

The outer periphery of the core 26 forms the resin seal lip 3 and a screw groove 26a in a spiral shape is formed on the outer periphery of the core 26.

The upper mold half 21 is adapted to contact or separate from the upper surface of the ring mold 27 of the lower mold half 22 and closes the annular recess 28 to form the cavity 23. An annular projection 29 projecting into the annular recess 28 is disposed above the cavity 23.

The resin ring 40 is preliminarily formed to provide a conical washer shape and this conical washer like resin ring 40 has an distal outer end 41 which is engaged with a corner portion of the reinforcing ring 4 having an L-shape in section and being mounted on the bottom surface of the annular recess 28 of the lower mold half 22 and having a distal inner end 42 disposed so as to lean against the upper end portion of the core 26 of the lower mold half 22 to thereby close the opening of the cavity 23.

In the location described above, a closed space 43 in right angled triangle shape with the resin ring being an oblique side is formed between the resin ring 40 and the corner portion formed by the outer peripheral surface of the core 26 of the lower mold half 22 and the upper surface of the lower mold body 24. The conical washer like resin ring 40 can be easily formed, as shown in FIG. 1, by cutting away from a thickened cylindrical resin material 50.

Figure 1A:
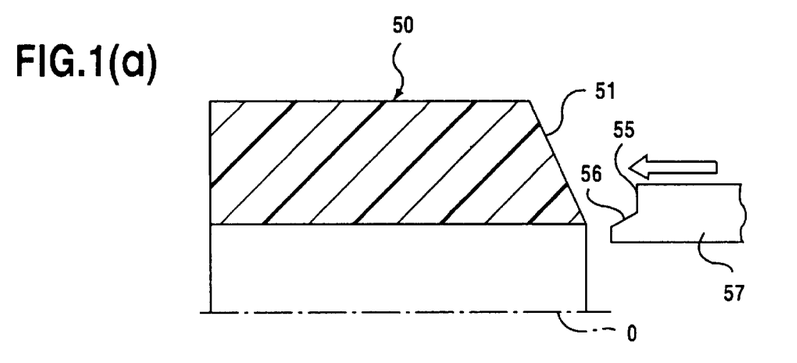
Figure 1B:
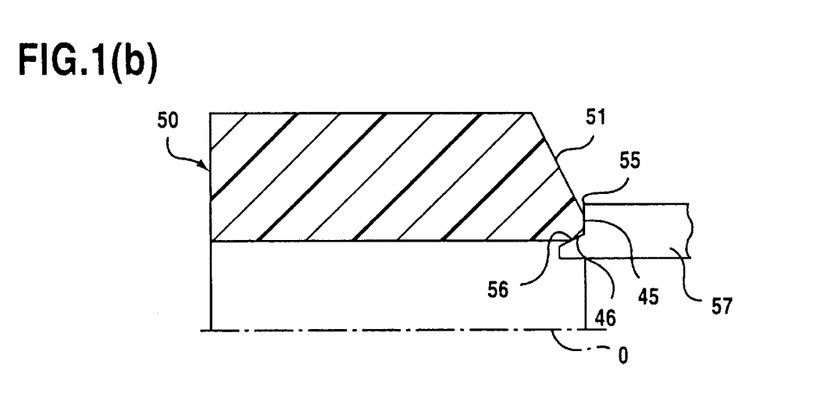

Namely, the end face 51 of the resin material 50 is formed to provide a conical shape inclining from the outer diameter side to the inner diameter side. The resin ring 40 having a predetermined thickness is produced, while rotating the resin material 50 about the central axis O, by cutting the resin material 50 by means of a cutter knife 52 from the outer peripheral side of the resin material towards the inner diameter side in a direction parallel to the conical end face 51 of the resin material 50 with a predetermined thickness.

Figure 1C:
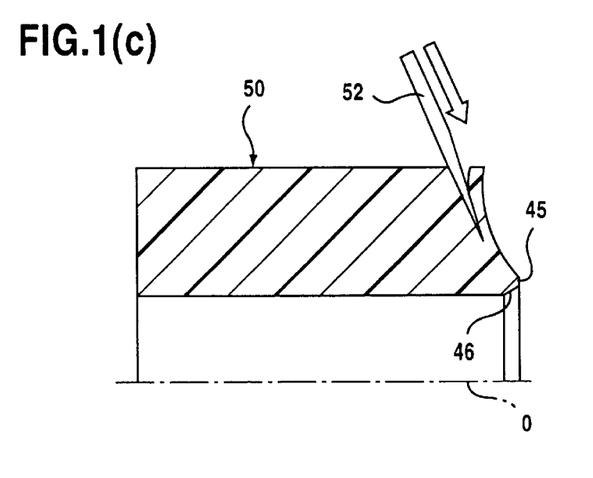
Figure 2A:
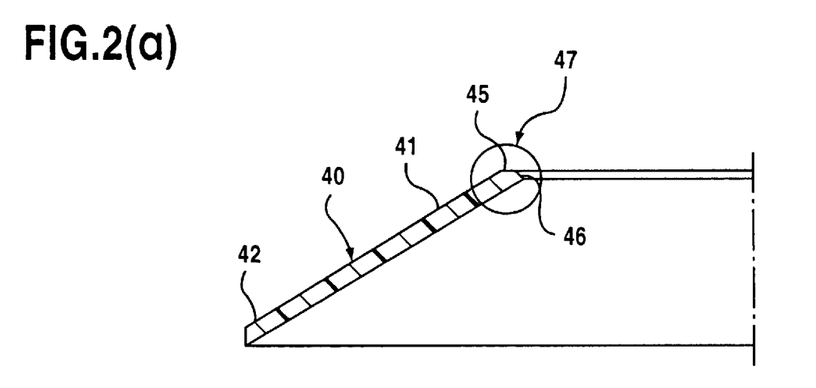
Figure 2B:
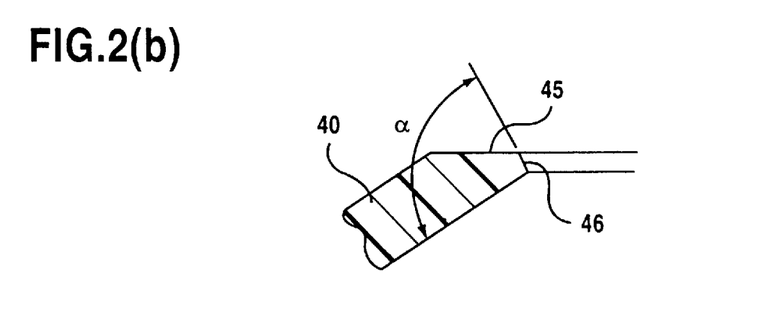

Then, a chamfering working is effected to a sharply projecting edge portion 47 of the conical washer like resin ring 40 on the side of the seal lip 3. This chamfered portion is formed with a first chamfered portion 45 substantially perpendicular to the central axis of the resin ring 40 and a second chamfered portion 46 substantially perpendicular to the conical surface thereof.

Figure 1D:
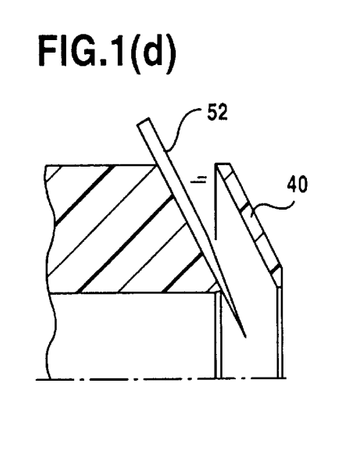

In the present embodiment, the chamfering working is done before the cut-away of the resin ring 40 by a bite 57, blade member, having first and second blade portions 55 and 56 which correspond to the first and second chamfered portions 45 and 46, respectively, and after the chamfering working, the resin ring 40 having the predetermined thickness is cut away. Such chamfering working is of course done after the cut-away of the resin ring 40.

Figure 3A:
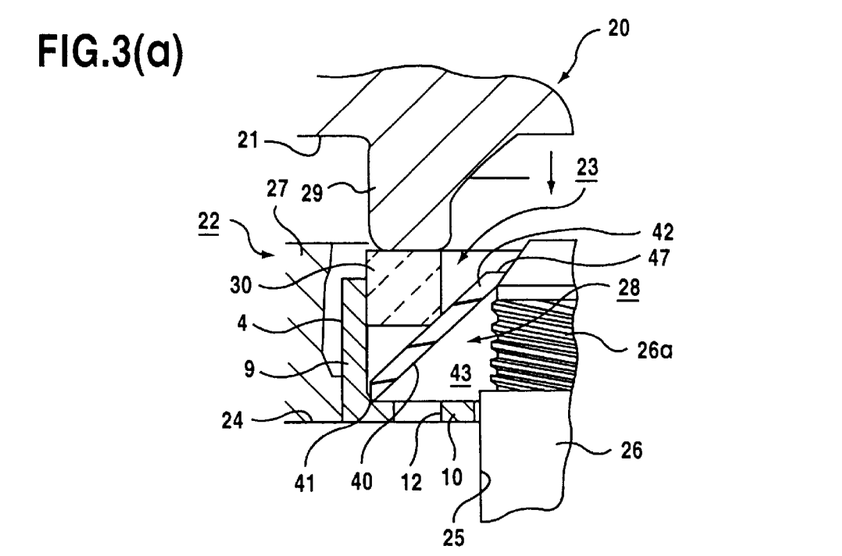
Figure 3B:
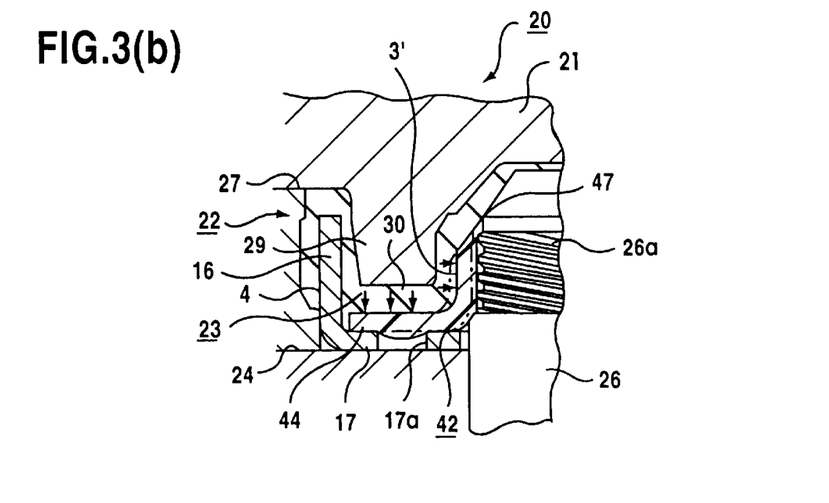
Figure 3C:
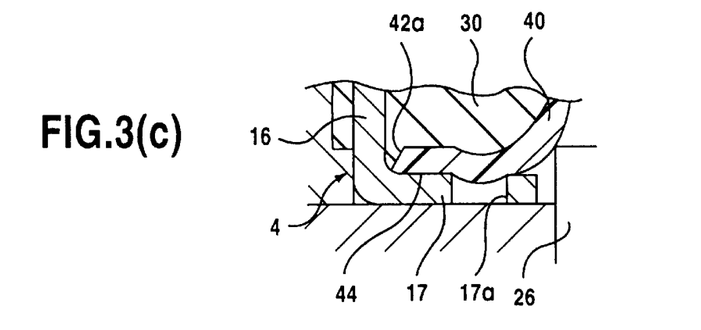

Then, the annular rubber base substance 30 having an L-shaped section is mounted on the resin ring 40 (such as shown in FIG. 3), and the rubber base substance 30 and the resin ring 40 are both pressurized downward by the annular projection 29 of the upper mold half 21. The resin ring which is heated and softened and pressed by a mold clamping pressure; and is bent at its central portion into the space 43 between the annular recess 28 and the resin ring 40, and the inner end portion of the resin ring 40 is forced against the outer peripheral surface of the core 26 to thereby form the cylindrical seal lip 3 having an outer shape corresponding to the outer peripheral shape of the core 26. The outer end portion of the resin ring 40 is forced against the inward flange portion 10 of the reinforcing ring 4 so as to provide a flanged shape corresponding to the outer shape of the flange portion 10 of the reinforcing ring 4. A flange portion 44 of the resin ring 40 bites the inside of the hole 12 of the reinforcing ring 44, thus being firmly fixed thereto.

As described above, according to the preliminary formation of the resin ring 40 providing the conical washer shape, the outer end side forming the flange portion 44 and the inner end side forming the resin seal lip 3 are bent substantially the same extent, thus being excellent in the moldability. Furthermore, the location of the outer end portion of the resin ring 40 to the corner portion of the reinforcing ring 4 to close the opening of the annular recess 28 prevents the movement of the fluidized rubber substance 30 to the back surface side of the resin ring 40, and accordingly, the mold closing pressure can be effectively applied for the formation of the resin ring 40. Thus, such manufacturing method can be particularly effective for the formation of the resin ring from the PTFE (tetrafloride ethylene resin) which generally has a worse moldability.

A spiral screw groove 26a is formed on the outer peripheral surface of the core 26 against which the inner side end of the resin ring 40 is forced, and this screw groove 26a is transferred to the inner surface of the softened resin ring 40, whereby the seal lip 3 provided with the screw groove can be molded at the same time as the vulcanization formation.

According to the manufacturing method of the present invention, the thin edge portion 47 of the end portion of the resin ring 40 is eliminated, and the resin ring 40 is, thus, hardly deformed, by effecting the chamfering working to the sharply projected edge portion 47 at the end portion of the resin ring 40, thereby improving the handling ability.

Figure 4A:
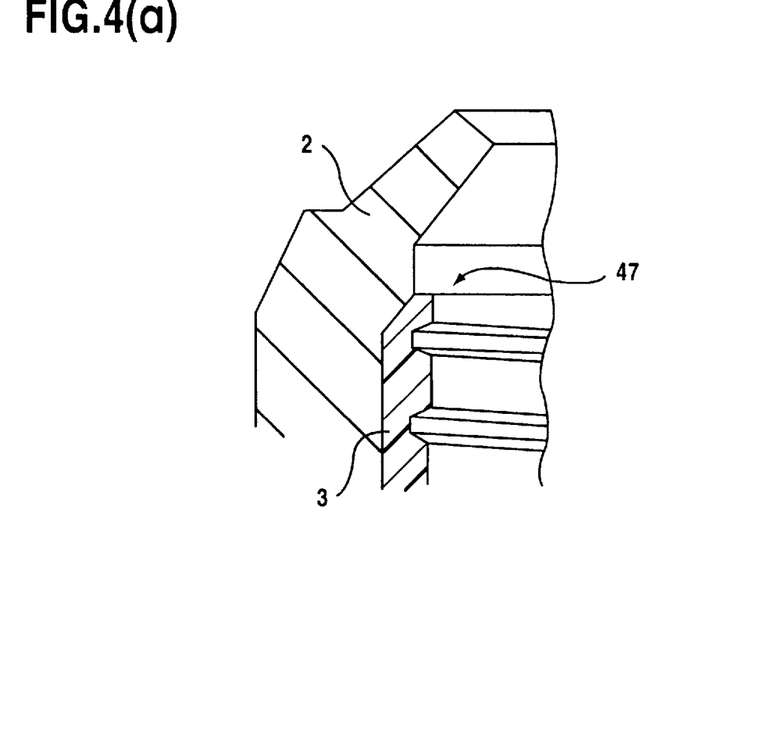
Figure 4B:
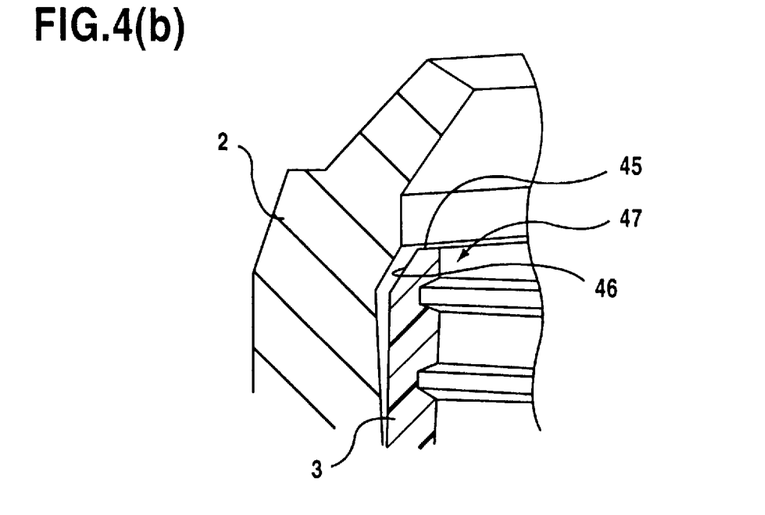

Furthermore, when the resin ring 40 is, thus, integrally molded with the rubber like elastic seal lip 2, since a sharpe edge portion is not present, the fluidized rubber substance can be smoothly moved without being interferenced with by the resin seal lip 3 (as shown in FIGS. 4(a) and (b)) even if it moves around the end portion of the resin ring 40.

FIG. 6 shows another manufacturing method of the sealing device, which is basically the same as that described above and differs therefrom in that a surface treatment for the bonding of the resin material to the resin ring 40 is effected before the location of the chamfered resin material in the mold assembly 20.

Figure 8:
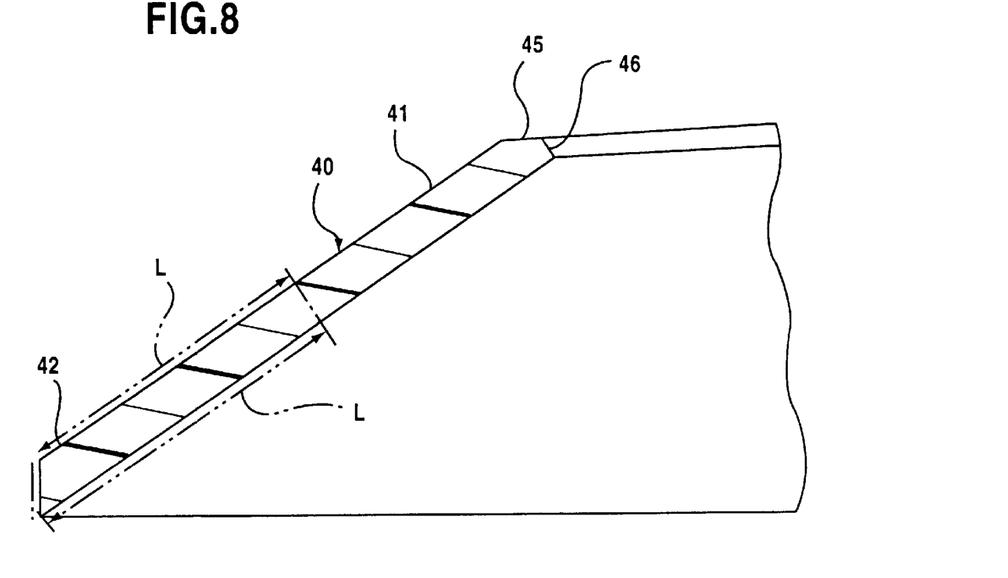
FIG. 8 is a sectional view of the main portion of the resin ring for molding the first seal ring of FIG. 7.

Namely, as shown in FIG. 8, during the molding of the chamfered resin ring 40, a bonding agent is coated continuously circularly on the outer diameter side end surface 42a of the resin ring 40. The coated bonding agent actually extrudes over the end surface 42a and adheres not only to the end surface 42a of the resin ring 40 but also to the both side surfaces thereof. If the bonding agent adheres to the inner diameter side of the resin ring 40, the resin seal lip 3 and the rubber like elastic ring 40 are bonded to each other during the molding process, so that an allowable range L giving no affect due to the adhesion of the bonding agent is determined. This allowable range L corresponds to a portion, which is to be formed as the resin flange portion 9 after the molding, of the outer diameter side of the resin ring 40.

Since the outer diameter side end surface 42a of the resin ring 40 is formed as a taper surface, a gap in V-shape is formed between this taper surface and the outer cylindrical portion 16 of the reinforcing ring 4 as shown in FIG. 3(c), and the rubber material invaded into this gap is forcibly pressed against the outer diameter side end surface 42a or the resin ring 40 by a wedging function thereof. Accordingly, it is extremely effective to utilize the outer diameter side end surface 42a as the bonding surface.

Of course, the formation of the continuous bonded portion H is not limited to the outer diameter side end surface 9a of the resin flange portion 9, as described hereinbefore, and the continuous bonded portion may be formed to an optional position of the contacting surface between the resin flange portion 9 to the rubber like elastic flange portion 13, and hence, the coating position will be determined in correspondence to the continuous bonded portion.

As the material of the bonding agent, an optional material is suitably selected in accordance with the substance of a resin material constituting the first seal ring 7 and the substance of a rubber like elastic material constituting the second seal ring 8. Further, surface treatment will be effected as occasion demands before the coating of the bonding agent. For example, in the case of a PTFE (polytetrafluoroethylene), since it has worse bondability, a metal sodium treatment is effected to the surface of the seal ring to thereby activate the surface. However, since the bonding agent is selected in the consideration of the mutual relation with the resin material and the rubber like elastic material, it is possible to bond the resin ring 40 without using any bonding agent in accordance with the material to be selected. For example, in the case where the resin material is PTFE and the rubber like elastic material is of a material other than fluoro-rubber material, the resin ring 40 will be able to be bonded only by effecting the metal sodium treatment without using the bonding agent.

In the described embodiment, the manufacturing method was described with respect to the sealing device of a compound type of the rubber like elastic seal lip and the resin seal lip, but the method can be applied to the sealing device of only the resin seal lip. Further, as the sealing device, an outer seal type sealing device may be utilized other than the inner seal type sealing device described herein.

Furthermore, in the above embodiment, there is shown an example in which the end surface of the cylindrical resin material is cut away so as to project outward at its inner diameter side, but the end surface may be cut away in conical shape so as to recess inward at its inner diameter end.

Posibility of Industrial Usage

As described hereinabove, according to the present invention, since the chamfering working is effected to the sharp edge portion of the end portion of the resin ring, the thin edge portion at the end portion of the resin ring is eliminated and hence hardly deformed, thus improving its handling ability.

Furthermore, in the case of the integral molding with the rubber like elastic seal lip, the fluidized rubber like elastic material is never influenced by the resin ring because of no provision of the sharp edge portion even if the fluid rubber like elastic material is moved round the resin ring end portion, thus eliminating after treatment.

We claim:

1. A method of manufacturing a sealing device by utilizing a mold assembly including an inner cavity, comprising the steps of:

arranging a reinforcing ring in the cavity of the mold assembly;

forming a resin ring in conical washer shape by cutting away a conical washer of a predetermined thickness from an end portion of a cylindrically formed resin material by cutting along an acute angle to a center axis of the cylindrically formed resin material, the conical washer being cut to have a cross section with two generally parallel opposite side faces and two generally parallel opposite edge faces across the predetermined thickness, such that an acute angle is formed at a corner between one of said side faces and one of said edge faces so as to create a sharply projecting edge portion at said corner, and chamfering said sharply projecting edge portion such as to remove the acute angle at said corner;

disposing the chamfered conical washer on the reinforcing ring in the mold cavity;

disposing a rubber like elastic material on the resin ring;

molding the rubber like elastic material in a predetermined shape by heating under pressure the reinforcing ring, the resin ring and the rubber like elastic material so as to fluidize the rubber like elastic material to fill in the mold cavity; and bending the resin ring so as to provide an L-shaped section by utilizing a pressure of the rubber like elastic material fluidized in the mold cavity so that a V-shaped space is defined between the edge face of the resin ring and an outer cylindrical surface portion of the reinforcing ring so that the rubber material is intruded into the space to enhance an adhesiveness therebetween; and Wherein a shape of the chamfered portion is composed of a first chamfered portion substantially perpendicular to a central axis of the conical washer and a second chamfered portion substantially perpendicular to the conical surface.

2. A method of manufacturing a sealing device according to claim 1, wherein the sharping projecting edge position is subjected to said chamfering before the cutting-away of the conical washer.

3. A method of manufacturing a sealing device according to claim 1, wherein the first chamfered portion and the second chamfered portion are simultaneously chamfered by a blade member having first and second blade portions respectively corresponding to the first and second chamfered portions.

4. A method of manufacturing a sealing device according to claim 1, wherein a resin seal lip portion which corresponds to a portion to be bonded to the rubber like elastic material, before the chamfered conical washer has been disposed in the mold cavity, is subjected to a surface treatment.

5. A method of manufacturing a sealing device according to claim 4, wherein the surface treatment is a sodium treatment.

6. A method of manufacturing a sealing device according to claim 1, wherein the conical washer is forced against the reinforcing ring by utilizing a pressure of the fluidized rubber material and the conical washer is fixed to the reinforcing ring by extending into and biting a hole in the reinforcing ring.

7. A sealing device mounted between a housing and a rotation shaft relatively rotatable with respect to the housing, comprising:

a first seal ring having an annular flange portion disposed so as to surround the rotation shaft and to extend in a radial direction thereof and having a resin lip disposed so as to surround the rotation shaft from an inner diameter end portion of the annular flange portion, said resin seal lip extending along the axial direction of the rotation shaft towards a fluid side to be sealed, said resin seal lip having a seal surface slidably contacting the rotation shaft in a sealed manner, said annular flange portion further having a tapered outer diameter side end surface (42a) so as to form a wedging action when rubber is pressurized thereover; and a second seal ring having a rubber like elastic flange portion disposed so as to surround the rotation shaft and extend in the radial direction thereof and having a rubber like elastic seal lip disposed so as to surround the resin seal lip and to extend along the axial direction of the rotation shaft beyond the resin seal lip towards the fluid to be sealed, said rubber like elastic seal lip having a lip front end provided with a seal surface slidably contacting the rotation shaft in a sealed manner, said second seal ring being located at a fluid side of the first seal ring such that said second seal ring contacts said tapered outer diameter side end surface (42a) in a manner wherein a V-shaped space jammed with rubber material is formed;

said first seal ring being formed from a bent conical washer like resin ring having an L-shaped section, and said resin seal lip having a front end edge portion which is chamfered; and wherein the chamfered surface is composed of a first chamfered portion substantially perpendicular to a central axis of the conical washer and a second chamfered portion substantially perpendicular to the conical surface.

8. The sealing device according to claim 7, wherein the resin flange portion and the rubber like elastic flange portion are bonded through at least one of continuous bonded portion which continuously surrounds at least the rotation shaft to thereby seal between the resin flange portion and the rubber like elastic flange portion.

9. The sealing device according to claim 8, wherein the continuous bonded portion is a portion formed on an outer diameter side end surface of the resin flange portion.

10. The sealing device according to claim 9, wherein the outer diameter side end surface of the resin flange portion is formed with a conical washer shape having a taper surface (42a).

11. The sealing device according to claim 9, wherein the continuous bonded portion is a portion formed on a side surface of the resin flange portion on the sealed fluid side.

12. The sealing device according to claim 8, wherein there is a plurality of said continuous bonded portions.

* * * * *